Patented June 1, 1937

2,082,395

UNITED STATES PATENT OFFICE 2,082,395

ESTERS OF NUCLEOTIDES AND PROCESS OF MAKING SAME

Max Hartmann, Riehen, near Basel, and Fritz Locher, Basel, Switzerland, assignors to the firm Society of Chemical Industry in Basle, Basel, Switzerland No Drawing. Application July 7, 1934, Serial No. 734,200. In Switzerland July 21, 1933

16 Claims. (Cl. 260—34)

This invention relates to the manufacture of new physiologically highly active substances by acetylating a nucleotide obtainable from a vegetable or animal extract, for instance such nucleotides as adenosine-phosphoric acids, like adenylic acid from yeast or muscle, or adenoisine-triphosphoric acid, further guanylic acid, cytidylic acid or the like. It is preferable to conduct the reaction in presence of an acid binding agent, such as an alkali or earth-alkali carbonate, or a tertiary base, such as pyridine, quinoline, or dimethylaniline. The activity of the nucleotide derivatives obtained exceeds in high degree that of the parent materials. The acetylated nucleotides can be purified, if desired, by the methods usual in the chemistry of nucleotides, for instance by precipitation by means of a heavy metal salt or conversion into a salt of an organic base, particularly an alkaloid. The new compounds may be administered for example by intravenous or intramuscular injections. In regard to the therapeutic effect of these compounds compare for example J. H. Gaddum, "Gefässerweiternde Stoffe der Gewebe" pages 77–84, published by Georg Thieme, Leipzig (1936).

The following examples illustrate the invention, the parts being by weight, unless otherwise stated, (the parts by weight and parts by volume are related to each other in the manner of the kilo to the litre):—

Example 1

1 part of dry yeast adenylic acid is suspended in 50 parts by volume of dry pyridine and after addition of 5 parts of acetic anhydride the suspension is heated for 2 hours at 60° C. In the course of half-an-hour the adenylic acid, which is sparingly soluble in pyridine, has passed into solution. The cooled mixture is evaporated in a vacuum, the residue is dissolved several times in water and the water is distilled until the pyridine has been expelled. By evaporating the solution in a vacuum there is obtained a resinous residue, freely soluble in water, containing one acetyl-group in the molecule; no free amino-group can be detected by means of nitrous acid in this residue. An aqueous solution of this substance yields a voluminous precipitate on addition of a basic lead acetate.

Example 2

1 part of muscle adenylic acid, 50 parts by volume of pyridine and 5 parts of acetic anhydride are heated for half-an-hour at 60° C. and for 1 hour at 100° C. The mixture is worked up as described in Example 1. The acetyl compound of muscle adenylic acid is also a colourless to a feebly yellow resin, whose properties agree in essence with those of the acetylated yeast adenylic acid.

Example 3

4 parts of yeast adenylc acid, free from water, are added to 120 parts by volume of pyridine and 40 parts by volume of acetic anhydride, and the mixture is heated for 2 hours at 60° C. The solution thus obtained is evaporated to dryness in a vacuum and the residue is dissolved in 500 parts by volume of water; the solution is neutralized with caustic soda solution. The acetylated acid is now precipitated with the smallest necessary quantity of basic lead acetate. After rapidly filtering the lead salt by suction and thoroughly washing it with water, it is decomposed in aqueous solution by means of sulfuretted hydrogen. The clear solution obtained by filtering the lead sulfide is evaporated to dryness in a vacuum, whereby the mono-acetyladenylic acid is obtained in the form of a nearly colourless resin, which is particularly easily pulverized in acetone. It is freely soluble in water and gives no nitrogen when tested with nitrous acid in accordance with the directions of Van Slyke. This method allows a precise indication of aliphatic primary amines. When treated with nitrous acid they produce the corresponding alcohols with evolution of nitrogen, from the volume of which the contents of amino groups in the substance used can be calculated (cf. Berichte der Deutschen Chem. Gesellschaft vol. 43, page 3170, 1910). The composition corresponds with that of a mono-acetyladenylic acid. By neutralizing in aqueous solution the free acid with a solution of brucine in methyl-alcohol the crystallized brucine salt is precipitated; by converting this into the ammonium salt and then into the lead salt the free acid may again be obtained in a pure state.

Example 4

1 part of cytosine-phosphoric acid, 80 parts by volume of dry pyridine and 10 parts by volume of acetic anhydride are heated together for 2½ hours on the boiling water-bath. The mixture is evaporated to dryness in a vacuum and the residue dissolved several times in water, which is distilled under diminished pressure; these operations being continued until the pyridine has been completely expelled. After distilling the water, the new mono-acylted compound is obtained in the form of a bright yellow resin, freely soluble in water.

Example 5

1 part of crystallized guanylic acid is suspended in 75 parts by volume of dry pyridine and, after addition of 7.5 parts by volume of acetic anhydride, the whole is heated for 5 hours on the boiling water-bath. The product is worked up as described in the preceding example whereby the acetylguanylic acid is produced in the form of a bright yellow resin.

Example 6

1 part of crystallized uridine-phosphoric acid, 90 parts by volume of pyridine and 6 parts by volume of acetic anhydride are heated together on the boiling water-bath for 2½ hours. The mixture is worked up as described in the foregoing examples, and the mono-acetyluridine-phosphoric acid is obtained in the form of a yellowish resin.

Example 7

1 part of desiccated yeast adenylic acid is suspended in 50 parts of dry dimethylaniline and after addition of 5 parts of acetic anhydride the mixture is heated on the water-bath in the course of 1 hour to a temperature of 60° C. The resulting products are diluted with water whereby the dimethylaniline is separated as a supernatant layer, which can easily be removed from the watery solution containing the acetylated adenylic acid. The latter may be isolated according to Example 4.

Example 8

1 part of desiccated yeast adenylic acid suspended in 50 parts of dry quinoline is treated with 5 parts of acetic anhydride by heating at 60° C. for 2 hours. After addition of water the base is separated from the watery layer and the acetylated adenylic acid is isolated from the latter according to Example 4.

Example 9

1 part of yeast adenylic acid is suspended in 50 parts by volume of pyridine and 6 parts of benzoyl chloride are added. The whole is allowed to stand over night. The adenylic acid passes into solution. The whole is distilled in a vacuum, and to the residue water is several times added and each time distilled in a vacuum to evaporate the pyridine. The resinous residue, insoluble in water, is dissolved in water by means of a little dilute sodium carbonate solution and is freed from liberated pyridine by evaporation in a vacuum. From the filtered aqueous solution of the sodium salt the free benzoyladenylic acid is precipitated by means of dilute hydrochloric acid. Finally, the substance is freed from all benzoic acid likely to be present by washing it on the filter with ether. The mono-benzoyladenylic acid is an easily pulverizable resin, freely soluble in alcohol and in aqueous alkalies or aqueous sodium carbonate; on the other hand it does not dissolve in water or dilute acid or in ether. From an alcoholic solution the substance is easily precipitatable by adding ether. The substance gives no reaction for the free amino-group when tested with nitrous acid.

What we claim is:—

1. The method of acylating nucleotides, which consists in heating a mononucleotide with an acetylating agent.
2. The method of acylating nucleotides, which consists in heating a mononucleotide with an acetylating agent in presence of an acid binding agent.
3. The method of acylating nucleotides, which consists in heating an adenosine phosphoric acid with an acetylating agent.
4. The method of acylating nucleotides, which consists in heating an adenosine phosphoric acid with an acetylating agent in presence of an acid binding agent.
5. The method of acylating nucleotides, which consists in heating an adenylic acid with an acetylating agent.
6. The method of acylating nucleotides, which consists in heating an adenylic acid with an acetylating agent in presence of an acid binding agent.
7. The method of acylating nucleotides, which consists in heating an adenylic acid with an acetylating agent in presence of a tertiary base.
8. The method of acylating nucleotides, which consists in heating an adenylic acid with an acetylating agent in presence of pyridine.
9. The mono-acetyl yeast adenylic acid which forms water-soluble alkali salts and a water-insoluble lead salt, the product being useful in therapeutics.
10. The mono-acetyl muscle adenylic acid which forms water-soluble alkali salts and a water-insoluble lead salt, the product being useful in therapeutics.
11. The compounds of the general formula $$R-CO-A$$

wherein R is a member of the group consisting of methyl and phenyl and A is a mono-nucleotide radical, which form water-soluble alkali salts and water-insoluble lead salts, the products being useful in therapeutics.

12. The compounds of the general formula $$CH_3-CO-A$$

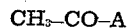

wherein A is a mono-nucleotide radical, which form water-soluble alkali salts and water-insoluble lead salts, the products being useful in therapeutics.

13. The compounds of the general formula $$C_6H_5-CO-A$$

wherein A is a mono-nucleotide radical, which form water-soluble alkali salts and water-insoluble lead salts, the products being useful in therapeutics.

14. The mono-acetyl adenylic acids, which form water-soluble alkali salts and water-insoluble lead salts, the products being useful in therapeutics.
15. The mono-benzoyl adenylic acids, which form water-soluble alkali salts and water-insoluble lead salts, the products being useful in therapeutics.
16. The mono-benzoyl yeast adenylic acid, which forms water-soluble alkali salts and water-insoluble lead salts, the product being useful in therapeutics.

MAX HARTMANN.
FRITZ LOCHER.